United States Patent
McCann

(10) Patent No.: US 7,008,025 B2
(45) Date of Patent: Mar. 7, 2006

(54) ELECTRONIC VEHICLE BRAKE SYSTEM WITH SECONDARY BRAKING PROVISION

(75) Inventor: Denis John McCann, Rochester Hills, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 10/769,273

(22) Filed: Jan. 30, 2004

(65) Prior Publication Data

US 2005/0168064 A1    Aug. 4, 2005

(51) Int. Cl.
  *B60T 8/88* (2006.01)
(52) U.S. Cl. .................... 303/122.15; 303/7; 303/9.63; 303/127
(58) Field of Classification Search ............. 303/3, 303/7, 9.63, 9.66, 127, 122.09, 122.15
See application file for complete search history.

(56) References Cited

U.S. PATENT DOCUMENTS

| | | | |
|---|---|---|---|
| 4,632,466 A * | 12/1986 | Grauel et al. ................. | 303/7 |
| 5,328,251 A | 7/1994 | Brearley | |
| 5,443,306 A * | 8/1995 | Broome ........................ | 303/3 |
| 5,700,063 A | 12/1997 | Kiel et al. | |
| 5,718,486 A * | 2/1998 | Vollmer et al. ................ | 303/3 |
| 5,848,826 A * | 12/1998 | Muller ...................... | 303/22.4 |
| 6,382,741 B1 * | 5/2002 | McCann et al. ............ | 303/191 |
| 6,644,758 B1 | 11/2003 | Stumpe | |

FOREIGN PATENT DOCUMENTS

| | | |
|---|---|---|
| DE | 195 04 393 C1 | 3/1996 |
| DE | 101 55 952 A1 | 5/2003 |
| EP | 0 387 004 A2 | 9/1990 |
| EP | 1122142 * | 8/2001 |

OTHER PUBLICATIONS

European Search Report, May 5, 2004.

* cited by examiner

*Primary Examiner*—James McClellan
*Assistant Examiner*—Bradley King
(74) *Attorney, Agent, or Firm*—Carlson, Gaskey & Olds

(57) ABSTRACT

An electronic brake system for a tractor-trailer vehicle includes a front electronic brake system for braking a front axle assembly and a rear electronic brake system for braking a rear axle assembly. During normal vehicle operation, front and rear air reservoirs supply air to actuate front and rear brake actuators, respectively. In response to a failure of the front electronic brake system, an electronic control unit automatically activates a trailer control valve to supply air to actuate the front brake actuator in addition to actuating the rear brake actuator from the rear air reservoir. The trailer control valve receives air supply from an independent reservoir.

23 Claims, 1 Drawing Sheet

ELECTRONIC VEHICLE BRAKE SYSTEM WITH SECONDARY BRAKING PROVISION

BACKGROUND OF THE INVENTION

This invention generally relates to a method and apparatus for providing a secondary braking force for an electronic vehicle brake system in response to a failure of a front electronic brake system.

An electronic braking system (EBS) includes an electronic control unit (ECU) that generates control signals, which are transmitted to front and rear vehicle brakes. Typically, the front brakes are on a front EBS circuit and the rear brakes are on a rear EBS circuit. In the event of a braking system failure, i.e. if one or both of the circuits fail, the system must be capable of achieving a specified level of braking performance. In other words, the EBS must be capable of providing sufficient secondary braking force if the primary system partially or completely fails.

Traditionally, if one of the circuits fails, it is necessary for the remaining circuit to provide the prescribed level of braking performance. However, this configuration is not always sufficient for certain types of vehicles. For example, tractor-trailers or other similar towing vehicles have lightly loaded rear drive axles when the vehicle is not towing anything. If the front EBS circuit fails under this condition, insufficient braking torque is applied to the rear drive axles before wheel lock-up occurs. This means that the prescribed deceleration cannot always be achieved.

One solution to this problem has been to utilize spring actuators on the front brakes to achieve the desired braking performance. If the front EBS circuit fails, the front brakes are braked by operation of the parking hand control and the rear brakes are braked by the rear EBS circuit. Disadvantages with this solution are that the spring actuators increase cost, add weight, and make the system more complex. Further, this solution is incompatible with vehicle braking systems that include an electronic park braking system.

Thus, it is desirable to have an electronic braking system for a vehicle that provides sufficient secondary braking in response to a front EBS circuit failure without requiring the use of mechanical spring actuators, and which is fully compatible with electronic park brake systems, as well as overcoming the other above mentioned deficiencies with the prior art.

SUMMARY OF THE INVENTION

An electronic brake system for a tractor-trailer vehicle includes a front electronic brake system for braking a front axle and a rear electronic brake system for braking a rear axle. During normal vehicle operation, separate air reservoirs supply air to front and rear brake actuators. A trailer air reservoir supplies air to a trailer braking system via a trailer control valve. The trailer air reservoir is an independent reservoir from front and rear air reservoirs. In the event of the front electronic brake system failing, it is arranged that air from an output of the trailer control valve is connected to the front brake actuator in addition to actuating the rear brake actuator from the rear air reservoir.

In one disclosed embodiment, a solenoid valve is positioned downstream of the trailer control valve and upstream of the front brake actuator. The solenoid valve is energized to prevent air output from the trailer control valve from reaching the front brake actuator during normal brake operation. The solenoid valve is de-energized during a front electronic brake system failure to allow air to flow from the trailer control valve to the front actuator.

In one disclosed embodiment, two-way valves are positioned downstream from the solenoid valve and upstream from the front brake actuator. The front brake actuator comprises a driver side actuator for a driver side front brake and a passenger side actuator for a passenger side front brake. A first two-way valve is positioned between the solenoid valve and the driver side actuator and a second two-way valve is positioned between the solenoid valve and the passenger side actuator. The two-way valves are used to connect and control output from the trailer control valve and the solenoid valve to the driver and passenger side actuators. It should be understood that depending on the vehicle configuration, the driver side could be either on the left or right side of the vehicle.

In one disclosed embodiment, the vehicle includes an electronic park brake system having an electronic parking brake hand control. Operating the electronic parking brake hand control applies modulated braking on the front brakes via the trailer control valve and on the rear brakes with the rear electronic brake system in response to a failure of the front electronic brake system.

The subject invention provides sufficient secondary braking performance under all vehicle operating conditions. These and other features of the present invention can be best understood from the following specification and drawings, the following of which is a brief description.

DETAILED DESCRIPTION OF THE PREFERRED EMBODIMENT

Figure 1:
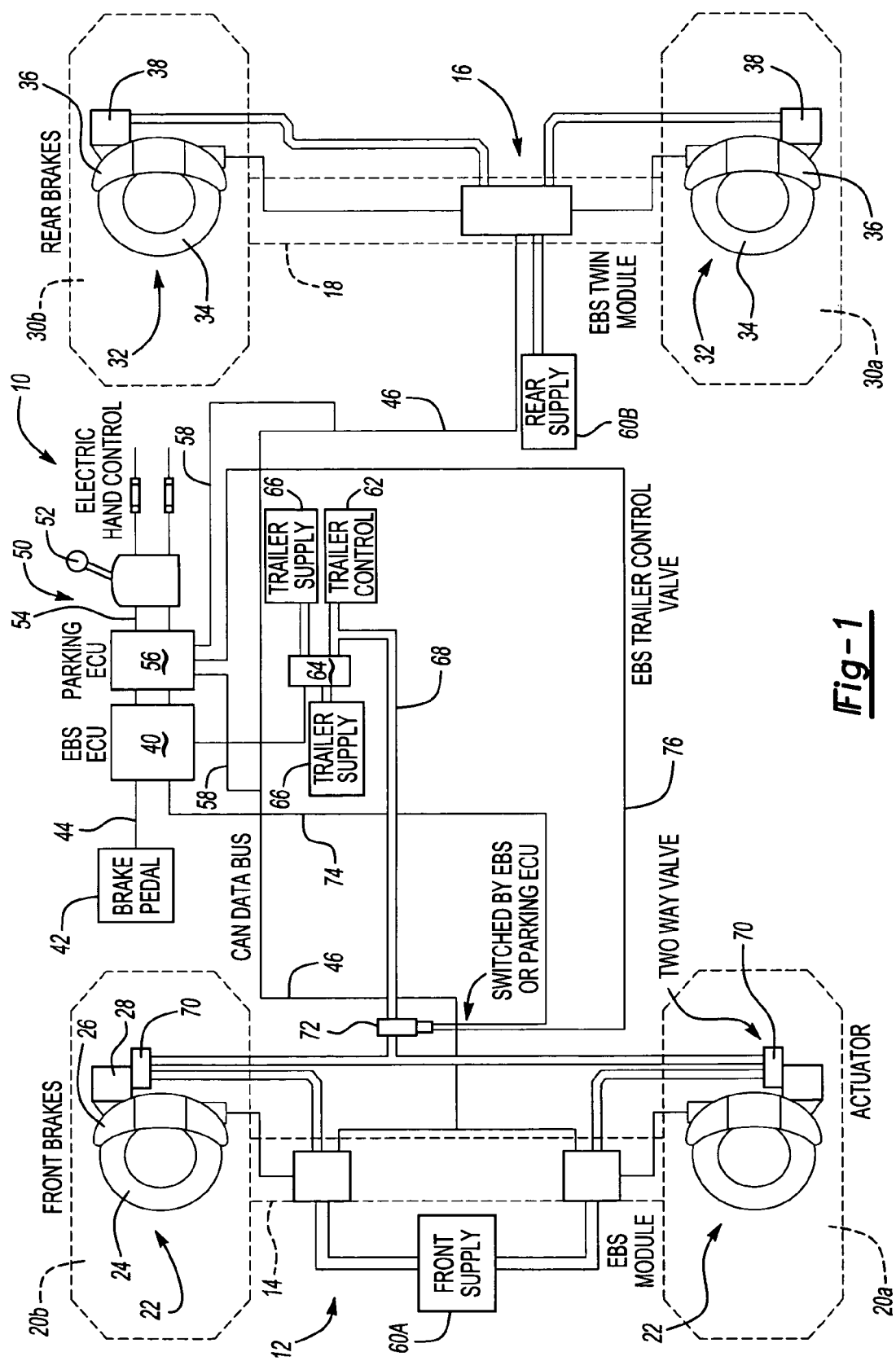
FIG. 1 is a schematic illustration of an electronic vehicle brake system incorporating the subject invention.

A schematic diagram of an electronic braking system (EBS) for a tractor-trailer or other similar towing vehicle, is shown generally at 10 in FIG. 1. The EBS 10 includes a front EBS circuit 12 for a front axle 14 and a rear EBS circuit 16 for a rear axle 18. Typically the front axle 14 is a non-drive steer axle and the rear axle 18 is a drive axle, however, other configurations could also be used. Further, the rear axle 18 can be a single drive axle or a tandem drive axle assembly.

The front axle 14 includes a driver side wheel assembly 20a and a passenger side wheel assembly 20b. The wheel assemblies 20a, 20b each include a front brake 22 having a rotating member 24, a non-rotating member 26 selectively engageable with the rotating member 24, and a front brake actuator 28. The front brake actuator 28 moves the non-rotating member 26 into engagement with the rotating member 24 in response to a brake command.

The rear axle 18 includes a driver side wheel assembly 30a and a passenger side wheel assembly 30b. The wheel assemblies 30a, 30b each include a rear brake 32 having a rotating member 34, a non-rotating member 36 selectively engageable with the rotating member 34, and a rear brake actuator 38. The rear brake actuator 38 moves the non-rotating member 36 into engagement with the rotating member 34 in response to the brake command.

The front EBS circuit 12 and the rear EBS circuit 16 are controlled via an EBS electronic control unit (ECU) 40. When a vehicle operator depresses a brake pedal 42, an electronic brake signal 44 is transmitted to the ECU 40, which in turn transmits control signals 46 to the front 12 and rear 16 EBS circuits.

The vehicle EBS 10 also may include an electronic park brake system 50 with an electric hand control 52. In response to operator input to the electric hand control 52, the electronic park brake system 50 generates a park brake signal 54 that is transmitted to a parking ECU 56. The parking ECU 56 can be separate from or incorporated into the EBS ECU 40. The parking ECU 56 in turn transmits parking control signals 58 to the front 22 and/or rear 32 brakes as necessary.

Both the vehicle EBS 10 and the electronic park brake system 50 utilize front and rear air reservoirs 60A and 60B, respectively. The front and rear air reservoirs 60A and 60B supply air to the front brake actuators 28 and rear brake actuators 38, respectively.

A trailer brake system 62 includes a trailer control valve 64 that receives air from a trailer air reservoir 66. The Wailer air reservoir 66 is an independent air supply from the front and rear air reservoirs 60A and 60B. In the event of a front EBS circuit 12 failure, the trailer air reservoir 66 is accessed by the trailer control valve 64, which is under electronic control, to supply air to the front brake actuators 28. Rear braking is provided by the rear EBS circuit 16.

A connection is made from an output 68 of the trailer control valve 64 to both front brake actuators 28 with two-way valves 70. Any type of two-way valve known in the art could be used. It may be possible to achieve secondary braking performance by connecting the output of the trailer control valve 64 to one front brake 22 only. A solenoid valve 72 is positioned downstream from the trailer control valve 64 and upstream of the two-way valves 70 and front brake actuators 28. The solenoid valve 72 prevents the output 68 from the trailer control valve 64 from reaching the front brake actuators 28 under normal braking operations. The solenoid valve 72 is energized at the onset of braking and is de-energized in the event of a system failure.

If a front failure occurs, the operator depresses the brake pedal 42 with a normal or standard braking input force. Modulated braking is applied to the front brakes 22 via the trailer control valve 64 and on the rear brakes 32 via the rear EBS circuit 16. In this configuration, the ECU 40 generates an electronic control signal 74 to energize and de-energize the solenoid valve 72.

If the vehicle includes the electronic park brake system 50, an alternative braking response is available. In the event of a front failure, the operation of the hand control 52 applies modulated braking on the front brakes 22 via the trailer control valve 64 and on the rear brakes 32 via the rear EBS circuit 16. In this configuration, the parking ECU 56 generates an electronic control signal 76 to energize and de-energize the solenoid valve 72.

As discussed above, the subject invention is preferably used on towing vehicles that have electronic braking systems (EBS) 10, and which have a trailer control valve 64 that is activated by an electronic control signal. The EBS provides modulated braking to both the front and rear axles in the event of a front failure via the trailer control valve. Further, the modulated braking can also be achieved when there is a electronic park brake system. In either configuration, the secondary braking requirements are easily met.

To verify that the solenoid valve 72 and the two-way valves 70 are operating properly, under predefined conditions, the solenoid valve 72 selectively remains de-energized on braking so that the front braking is done from the trailer control valve 64. The front EBS 12 would be inhibited to prevent both sources from applying the brakes 22. Monitoring front wheel slip and comparing it with slip at the rear wheels can be used to check proper operation of the front brakes.

Thus, the subject invention provides an electronic braking system for a towing vehicle that has sufficient secondary braking in response to a front EBS circuit failure without requiring the use of mechanical spring actuators, and which is fully compatible with electronic park brake systems. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An electronic braking system for a tractor-trailer vehicle comprising:
    a front electronic brake system including a front actuator for actuating front brakes in response to a braking command;
    a rear electronic brake system including a rear actuator for actuating rear brakes in response to said braking command;
    an electronic control unit for generating a brake activation signal in response to said braking command, said brake activation signal being transmitted to said front and rear actuators; and
    a trailer control valve operably connected to a trailer air supply for a trailer brake system and operably coupled to said front actuator wherein air is automatically supplied from said trailer air supply to said front actuator via said trailer control valve in response to a failure of said front electronic brake system.

2. A system as set forth in claim 1 wherein said trailer control valve and said rear actuator are simultaneously activated by said electronic control unit to provide modulated secondary braking in response to a failure of said front electronic brake system.

3. A system as act forth in claim 2 including a solenoid valve positioned downstream of said trailer control valve and upstream from said front actuator that prevents air output from said trailer control valve under normal braking conditions and allows air output from said trailer control valve in response to a failure of said front electronic brake system.

4. A system as set forth in claim 3 wherein said solenoid valve is energized in response to generation of said brake activation signal and de-energized in response to a failure of said front electronic brake system.

5. A system as set forth in claim 3 including a two-way valve positioned downstream of said solenoid valve and upstream of said front actuator to control air flow from said trailer air supply to said front actuator.

6. A system as set forth in claim 1 including a front and rear air supply for supplying air to said front and rear electronic brake systems that is independent from said trailer air supply.

7. A system as set forth in claim 1 including an electronic park brake system having an electronic hand control for generating a park brake force in response to an operator park brake command.

8. A system as set forth in claim 7 wherein operation of said electronic hand control and activation of said rear actuator provide modulated secondary braking in response to a failure of said front electronic brake system.

9. A method for providing secondary braking in an electronic braking system for a tractor-trailer vehicle comprising the steps of;
(a) generating a primary front braking force for braking a front electronic brake system during normal brake operation;
(b) generating a primary rear braking force for braking a rear electronic brake system during normal brake operation;
(c) automatically activating a trailer control valve in response to a failure of the front electronic brake system; and
(d) generating a secondary braking force by supplying air from a trailer brake air supply to a front brake actuator via the trailer control valve.

10. The method as set forth in claim 9 including the steps of providing a vehicle brake air supply including front and rear air reservoirs that are independent from the trailer brake air supply, supplying air from the front air reservoir to the front brake actuator during step (a), supplying air from the rear air reservoir to a rear brake actuator during step (b), and only supplying air from the trailer brake air supply to the front brake actuator during step (d).

11. The method as set forth in claim 10 wherein step (d) further includes the steps of applying modulated secondary braking by simultaneously actuating the front brake actuator from the trailer brake air supply via the trailer control valve and actuating the rear brake actuator from the vehicle brake air supply.

12. The method as set forth in claim 11 including the steps of installing a solenoid valve downstream from the trailer control valve, energizing the solenoid valve during normal brake operation to prevent air output from the trailer control valve, and de-energizing the solenoid valve during step (d) in response to detection of a front electronic brake system failure.

13. The method as sec forth in claim 12 including the step of connecting an output from the trailer control valve to the front brake actuator with a two-way valve.

14. The method as set forth in claim 13 including the step of depressing a brake pedal with a standard pedal application force to accomplish steps (a)–(b).

15. The method as set forth in claim 13 including the steps of providing an electronic park brake system having an electronic hand control, generating a park brake force in response to an operator park brake command, and applying modulated secondary braking by simultaneously operating the electronic hand control to actuate the front brake actuator from the trailer brake air supply via the trailer control valve and actuating the rear brake actuator from the vehicle brake air supply.

16. The method as set forth in claim 13 including the step of:
(e) de-energizing the solenoid valve during normal brake operation and actuating the front brake actuator via the trailer control valve during normal brake operation to verify that the solenoid valve and two-way valve remain serviceable.

17. The method as set forth in claim 16 including the step of preventing the front electronic brake system from accessing the vehicle brake air supply during step (e).

18. The method as set forth in claim 13 including the steps of monitoring front wheel slip, monitoring rear wheel slip, and comparing front and rear wheel slip to each other to verify proper operation of front brake members.

19. A system as set forth in claim 1 wherein said trailer control valve supplies air to a trailer brake system and supplies air to said front actuator through a pneumatic connection.

20. A system as set forth in claim 1 including a valve assembly positioned upstream from said front actuator and downstream from said trailer control valve, said valve assembly preventing air output from said trailer control valve to said front actuator under normal braking conditions and allowing air output from said trailer control valve in response to a failure of said front electronic brake system.

21. A system as set forth in claim 20 wherein said valve assembly includes at least one of a solenoid valve and a two-way valve.

22. A method as set forth in claim 9 including supplying air via the trailer control valve to a trailer brake system and supplying air to the front brake actuator through a pneumatic connection.

23. A method as set forth in claim 9 including positioning a valve assembly upstream from the front brake actuator and downstream from the trailer control valve to prevent air output from the trailer control valve to the front brake actuator under normal braking conditions and allow air output from the Wailer control valve in response to a failure of the front electronic brake system.

* * * * *

UNITED STATES PATENT AND TRADEMARK OFFICE
CERTIFICATE OF CORRECTION

PATENT NO.        : 7,008,025 B2
APPLICATION NO.   : 10/769273
DATED             : March 7, 2006
INVENTOR(S)       : McCann, Denis John It is certified that error appears in the above-identified patent and that said Letters Patent is hereby corrected as shown below:

Column 4, Line 40: Please delete "act" and replace with --set--

Column 5, line 42: Please delete "(b)" and replace with --(d)--

Column 6, line 43: Please delete "Wailer" and replace with --trailer--

Signed and Sealed this

Fifth day of September, 2006

JON W. DUDAS
*Director of the United States Patent and Trademark Office*